Patented May 2, 1933

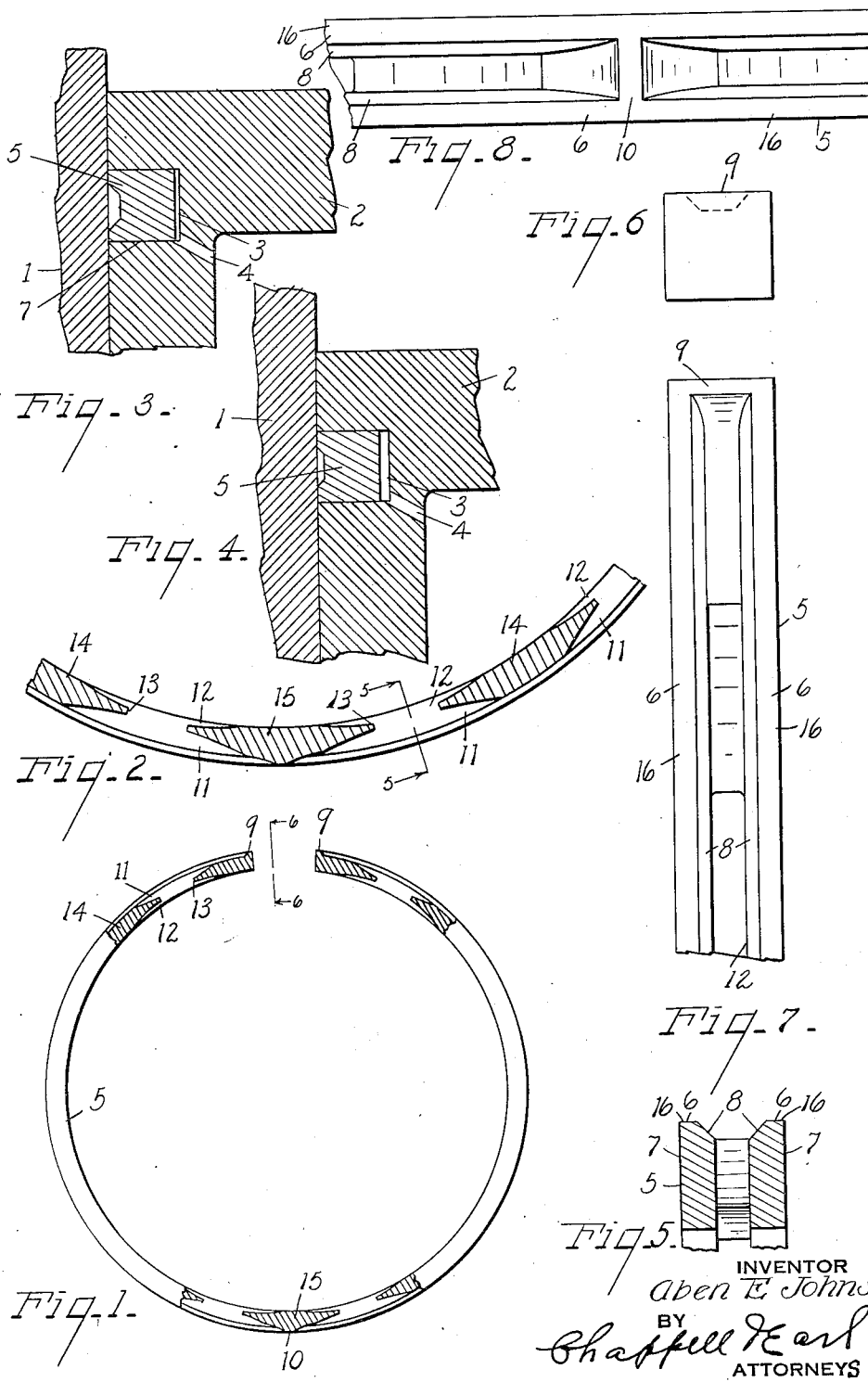

1,906,272

UNITED STATES PATENT OFFICE

ABEN E. JOHNSON, OF HASTINGS, MICHIGAN, ASSIGNOR TO HASTINGS MANUFACTURING COMPANY, OF HASTINGS, MICHIGAN

PISTON RING

Application filed April 6, 1932. Serial No. 603,486.

The main objects of the invention are:

First, to provide an improved piston ring which is well adapted for internal combustion engines which very quickly and automatically seats or adjusts itself to the cylinder in which it is installed and at the same time is very durable.

Second, to provide a piston ring of the type which permits the passage of lubricant therethrough which is at the same time strong and of very uniform tension.

Third, to provide an improved piston ring in which the pressures and stresses of operation are distributed and equalized.

Fourth, to provide a piston ring embodying these inventions which may be economically produced.

Objects relating to details and economies of my invention will appear from the description to follow. The invention is defined and pointed out in the claims.

A structure which is a preferred embodiment of my invention is illustrated in the accompanying drawing, in which:

Fig. 1 is a side elevation of my improved piston ring partially broken away and sectioned to disclose structural details thereof.

Fig. 2 is an enlarged fragmentary section thereof.

Fig. 3 is a fragmentary longitudinal section of a piston and cylinder embodying my improved piston ring, the cylinder and piston parts being conventionally illustrated.

Fig. 4 is a fragmentary section corresponding to Fig. 3 illustrating the result of wear on the ring.

Fig. 5 is an enlarged cross section on line 5—5 of Fig. 2.

Fig. 6 is an enlarged end elevation on line 6—6 of Fig. 1.

Fig. 7 is an enlarged fragmentary side elevation.

Fig. 8 is an enlarged fragmentary side elevation of the ring opposite the split thereof.

In the accompanying drawing, 1 represents the cylinder of an internal combustion engine and 2 a piston. These parts are shown conventionally. The piston is provided with a piston ring groove 3 and has a plurality of drainage bores 4 leading from this groove to the interior of the piston.

My improved piston ring designated generally by the numeral 5 is of the split type and is provided with a pair of peripheral spaced flanges 6, the outer walls of these coinciding with the flat parallel sides 7 of the ring. The inner walls 8 of these flanges are inclined inwardly.

The flanges are connected by a plurality of cross or transverse bridges, preferably being end bridges 9; that is, these bridges are at the split, and a bridge 10 disposed approximately 180° from these end bridges or directly opposite the split. These bridges reinforce the flanges, preventing breaking or shipping of the ends of the flanges at the joint and the bridge 10 reinforces the ring at the point directly opposite the split which is subject to the greatest strain when the ring is opened for placing upon a piston. I have not illustrated additional bridges although I have provided them at points spaced 90° with very satisfactory results.

I provide a plurality of external circumferentially spaced recesses 11 between the flanges, these recesses being of a depth substantially less than the radial width of the ring. Coacting similarly spaced internal recesses 12 are provided, these recesses communicating at their centers through openings 13.

The openings 13 are of such length and spaced so that the lands or bridges of material 14 and 15 between the openings are of substantially the same length as the recesses. These portions 14 of the ring are of substantial length and are uniformly positioned so that the ring is of substantially uniform tension. Owing to the shape of the flanges and the arrangement of these recesses in opposed axially aligned pairs, with the substantially solid portions 14 between, the ring is very strong and may be formed with the desired amount of tension.

When the ring is manufactured, the peripheral faces 16 are relatively narrow so that when the ring is installed, it quickly wears or seats itself to the cylinder, the faces 16, however, increasing in width as the wear takes place so that the ring, notwithstanding this provision for rapid seating or adjusting to the particular condition, is very durable. The faces of the transverse bridges are flush with these peripheral flanges or ribs and their faces are relatively narrow so that they seat with the flanges.

The aligned inner and outer recesses permit equalizing of the pressure on the inner and outer side of the ring so that the lubricant can flow from the outer to the inner coacting pockets or vice versa to equalize or maintain uniformity of pressure. These openings are spaced from the inner wall of the ring so that there is a minimum of tendency for the openings to clog and also, any material that may have collected on the edges of the opening is later freed. These openings through the ring provide not only an escape for the lubricant but equalization of pressures which is a desirable feature in the adjustment of the ring to the cylinder. The bottoms of the recesses are preferably curved, as illustrated, this resulting in the desired capacity for the recesses and also in the highly desired distribution of the material between the recesses.

As stated, my improved rings are very strong and uniformly resilient and quickly fit themselves to the cylinders, and at the same time are very durable.

I have not attempted to illustrate various adaptations of my improvements as it is believed that this disclosure will enable those skilled in the art to embody or adapt my improvements as may be desired.

Having thus described my invention, what I claim as new and desire to secure by Letters Patent, is:

1. A piston ring having spaced peripheral flanges connected at the ends of the ring and at a point approximately 180° therefrom by transverse bridges substantially flush with the peripheral faces of the flanges, said ring having a series of uniformly spaced external concave recesses between its said flanges of a depth substantially less than the radial width of the ring, and a series of internal concave recesses spaced to correspond with the spacing of the external recesses, said external and internal recesses having oppositely curved bottoms and centrally disposed communicating openings, the said openings being spaced so that the space therebetween is substantially the length of the recesses.

2. A piston ring having spaced peripheral flanges, a series of uniformly spaced external recesses between its said flanges of a depth substantially less than the radial width of the ring, and a series of internal recesses spaced to correspond with the spacing of the external recesses, said external and internal recesses having curved bottoms and centrally disposed communicating openings, the said openings being spaced so that the space therebetween is substantially the length of the recesses.

3. A piston ring having spaced peripheral flanges having inwardly inclined inner walls connected at the ends of the ring and at an intermediate point by transverse bridges substantially flush with the peripheral faces of the flanges, said ring also having a series of uniformly spaced external recesses between its said flanges, and a series of internal recesses spaced to correspond with the spacing of the external recesses, said external and internal recesses having centrally disposed communicating openings, the said openings being spaced approximately the length of the recesses.

4. A piston ring having spaced peripheral flanges having inwardly inclined inner walls, said ring also having a series of uniformly spaced external recesses between its said flanges, and a series of internal recesses spaced to correspond with the spacing of the external recesses, said external and internal recesses having centrally disposed communicating openings, the said openings being spaced approximately the length of the recesses.

5. A piston ring having spaced peripheral flanges, the inner walls of which are inclined inwardly, said flanges having a plurality of relatively narrow connecting bridges substantially flush with the circumferential faces of the flanges, said ring also having a series of uniformly and substantially spaced external concave recesses between said flanges of a depth substantially less than the radial width of the ring, and a series of internal concave recesses radially aligned therewith, said recesses having central communicating openings.

6. A piston ring having spaced peripheral flanges, said ring also having a series of uniformly and substantially spaced external concave recesses between said flanges of a depth substantially less than the radial width of the ring, and a series of internal concave recesses radially aligned therewith, said recesses having communicating openings.

7. A split piston ring having spaced peripheral flanges, the inner walls of which are inclined inwardly and the outer walls of which coincide with the parallel sides of the ring so that the width of the peripheral faces of the flanges increases as the flanges are worn in use, said ring also having cross bridges connecting said flanges at the ends of the ring and at a point diametrically opposite the joint, said cross bridges being flush with the circumferential faces of the ribs, said ring having a series of radially aligned pairs of external and internal recesses having inwardly and oppositely curved bottoms and communicating openings at the centers thereof.

8. A piston ring having spaced peripheral flanges, the inner walls of which are inclined inwardly and the outer walls of which coincide with the parallel sides of the ring so that the width of the peripheral faces of the flanges increases as they are worn, said ring also having a plurality of transverse bridges connecting said flanges, said bridges being flush with the circumferential face of the ring, said ring having a series of external circumferential spaced recesses between said ribs, and a series of internal circumferentially spaced recesses radially aligned and communicating with said external recesses.

9. A piston ring having spaced peripheral flanges, and a series of uniformly spaced external recesses between said flanges of a depth substantially less than the radial width of the ring, and a series of internal recesses spaced to correspond to the spacing of the external recesses, said recesses having curved bottoms and central communicating openings, the pairs of recesses being substantially spaced.

10. A piston ring having spaced peripheral flanges, and a series of uniformly spaced external recesses between said flanges of a depth substantially less than the radial width of the ring and a series of internal recesses spaced to correspond to the spacing of the external recess, said recesses having central communicating openings, the pairs of recesses being substantially spaced.

In witness whereof I have hereunto set my hand.

ABEN E. JOHNSON.